(12) United States Patent
Boardman et al.

(10) Patent No.: US 8,044,841 B1
(45) Date of Patent: Oct. 25, 2011

(54) GEOMETRY AND SENSITIVITY WEIGHTED DYNAMIC MULTI-SENSOR SELECTION SYSTEM AND METHOD

(75) Inventors: Jonathan Alan Boardman, Mount Laurel, NJ (US); Naresh Raman Patel, Bellmawr, NJ (US); Jeffrey Bruce Boka, Lumberton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 417 days.

(21) Appl. No.: 12/396,041

(22) Filed: Mar. 2, 2009

(51) Int. Cl.
*G01S 13/72* (2006.01)

(52) U.S. Cl. ............... 342/62; 342/97; 342/195; 342/59

(58) Field of Classification Search ............ 342/62, 342/67, 90, 95–97, 195, 59
See application file for complete search history.

(56) References Cited

U.S. PATENT DOCUMENTS

| | | | | |
|---|---|---|---|---|
| 5,429,322 A * | 7/1995 | Waymeyer | | 244/3.15 |
| 5,451,960 A * | 9/1995 | Kastella et al. | | 342/59 |
| 5,604,683 A * | 2/1997 | Roecker | | 342/378 |
| 7,026,980 B1 * | 4/2006 | Mavroudakis et al. | | 342/90 |
| 7,236,121 B2 * | 6/2007 | Caber | | 342/62 |
| 7,394,046 B2 * | 7/2008 | Olsson et al. | | 244/3.1 |
| 7,394,047 B1 * | 7/2008 | Pedersen | | 244/3.1 |
| 7,605,747 B1 * | 10/2009 | Mookerjee et al. | | 342/90 |
| 7,626,534 B1 * | 12/2009 | Boka et al. | | 342/90 |
| 2005/0040280 A1 * | 2/2005 | Hua | | 244/3.1 |
| 2007/0271032 A1 * | 11/2007 | Cheng et al. | | 701/207 |
| 2008/0128546 A1 * | 6/2008 | Olsson et al. | | 244/3.1 |

FOREIGN PATENT DOCUMENTS

JP 10267596 A * 10/1998

OTHER PUBLICATIONS

Misra, P., Enge, P., "Global Positioning System: Signals, Measurements and Performance", Ganga Jamuna Press 2004, pp. 176-180.

* cited by examiner

*Primary Examiner* — John Sotomayor
(74) *Attorney, Agent, or Firm* — Howard IP Law Group, PC

(57) ABSTRACT

A method of selecting a sub-set of a plurality of available sensors to guide an interceptor to a target is described. The method includes characterizing a quality of position estimate received from each of the plurality of available sensors, projecting the positioning errors of the sensors onto a plane normal to a line-of-sight of the interceptor, and selecting the sub-set of the plurality of available sensors based on the projection of positioning errors.

33 Claims, 8 Drawing Sheets

2 Sensors: 90, 180

1 Sensor: 90 degrees

GEOMETRY AND SENSITIVITY WEIGHTED DYNAMIC MULTI-SENSOR SELECTION SYSTEM AND METHOD

This invention was made with Government Support under Contract No. N00024-03-C-6110 awarded by the Department of the Navy. The Government has certain rights in this invention.

FIELD OF DISCLOSURE

The disclosed system and method relate to sensor systems, and more specifically, the disclosed system and method relate to the selection of sensors in a multiple sensor system.

BACKGROUND

Conventional tracking systems for guided interceptor missiles use a single sensor to track a target. These tracking systems use the information from the sensor to guide the interceptor missile to intercept and destroy a target, which may be a missile. However, a tracking system based on a single sensor is susceptible to positioning errors due to the geometry between the sensor and the target as well as errors due to the geometry between the interceptor and the target when sensor data is used to guide the interceptor. A multiple sensor system may reduce the positioning error, but monopolizes the full capabilities of all of the sensors thereby requiring additional sensors to track and target multiple targets.

Accordingly, an improved sensor and tracking system is desirable.

SUMMARY

In some embodiments, a method of selecting a sub-set of a plurality of available sensors to guide an interceptor to a target includes characterizing a quality of position estimate received from each of the plurality of available sensors, projecting the positioning errors of the sensors onto a plane normal to the line-of-sight of the interceptor, and selecting the sub-set of the plurality of available sensors based on the projection of positioning errors.

In some embodiments, a system for selecting a sub-set of a plurality of available sensors to guide an interceptor to a target includes a computer readable storage medium connected to a processor. The processor is configured to characterize a quality of position estimate received from each of the plurality of available sensors, project the positioning errors of the sensors onto a plane normal to a line-of-sight of the interceptor, and select the sub-set of the plurality of available sensors based on the projection of positioning errors.

DETAILED DESCRIPTION

Figure 11:
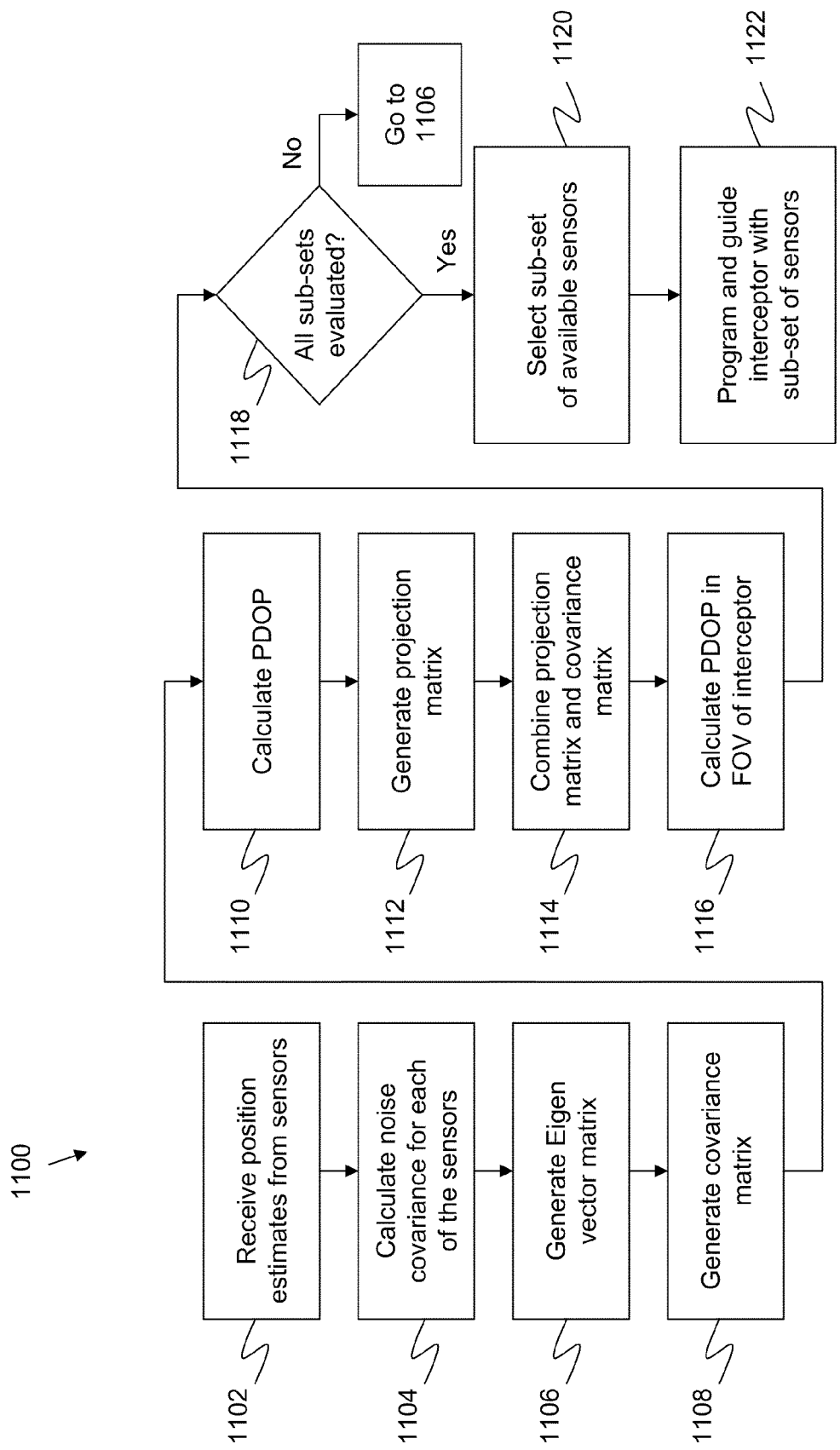
FIG. 11 is a flow diagram of one embodiment of a method of selecting a sub-set of available sensors.

With reference to FIG. 11, an improved system and method of targeting an object using one or more sensors are now described. The improved targeting system and method selects an optimal sub-set of available sensors based on positioning signals of the target received from the available sensors. The targeting system accounts for sensor-target geometry as well as target-interceptor geometry. The range and angle sensitivities of each tracking sensor are also taken into account in determining the sub-set of sensors. Selecting the sub-set of sensors minimizes the positioning error of the target in the interceptor frame of reference and enables a more accurate tracking of the target. Additionally, selecting a sub-set of sensors enables the other sensors to track and target other targets. The more accurate the position estimate of the target is by the sub-set sensors enables the interceptor to more accurately associate and resolve closely spaced objects, which enables the interceptor to target the correct target when it is surrounded by one or more additional objects.

Figure 1:
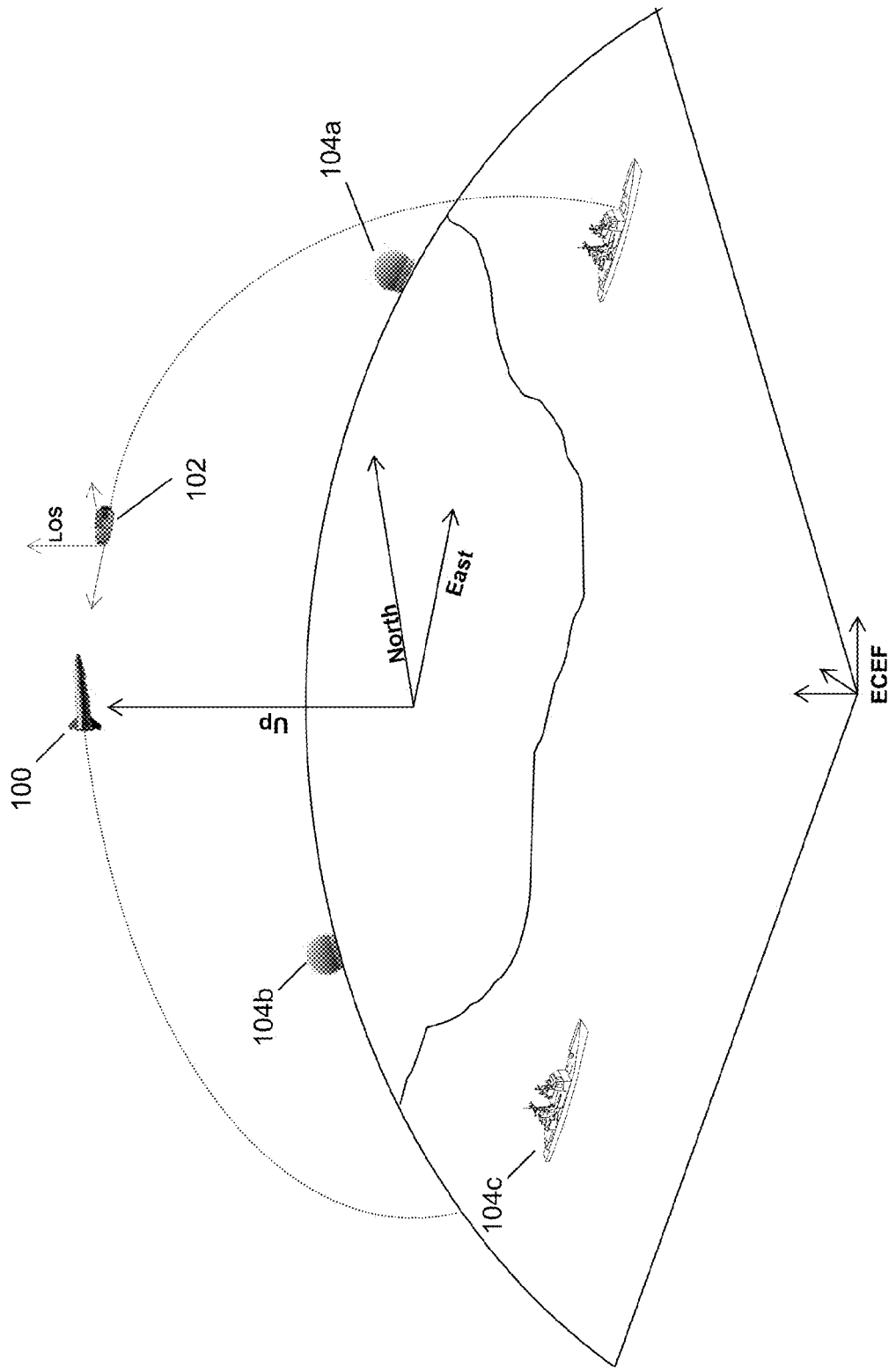
FIG. 1 illustrates one example of multiple sensors configured to track a target and guide an interceptor to the target.

FIG. 1 illustrates one example of sensors 104a-104c used to track a target 100 and guide an interceptor 102 to target 100. Although three sensors are shown, fewer or more sensors may be implemented to track target 100. In some embodiments, sensors 104a-104c are radar sensors, which may be located on land (e.g., sensor 104b), water (e.g., sensors 104a, 104c), air, or space.

At block 1102, each sensor 104a-104c provides a positioning estimate of the target 100. The positioning estimate from each sensor will have an uncertainty due to sensor sensitivity and the geometry and location between the sensor 104a-104c and the target 100. The uncertainty for each sensor 104a-104c is used in the selection of the optimal sub-set of available sensors as described below.

Figure 2:
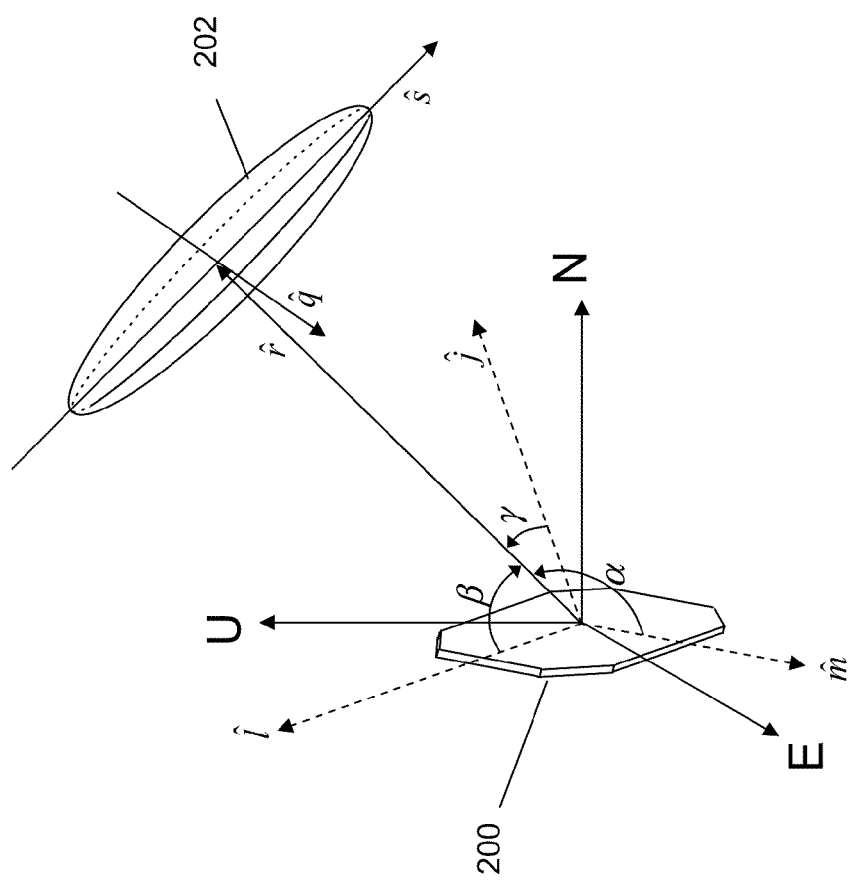
FIG. 2 illustrates one example of a sensor face and a corresponding covariance ellipsoid in accordance with the sensors illustrated in FIG. 1.

FIG. 2 illustrates one example of a sensor face 200 in accordance with the sensors 104a-104c illustrated in FIG. 1. As shown in FIG. 2, the sensor face 200 has its own reference frame, where $\hat{j}$ is a vector pointing along the line-of-sight of the sensor, e.g., normal to the sensor face 200, and $\hat{l}$ and $\hat{m}$ are vectors normal to $\hat{j}$ and to each other. Target filtering to determine the position of the target 100 with respect to each sensor 104a-104c may be performed in an East-North-Up (ENU) coordinate system as illustrated in FIG. 2. Unit vectors identifying the position of the target 100 with respect to the sensors 104a-104c may be developed as follows:

$$\hat{r} = [\cos\alpha \cos\gamma \cos\beta]^T \quad \text{(Eq. 1)}$$

$$\hat{q} = \hat{j} \times \hat{r} / |\hat{j} \times \hat{r}| \quad \text{(Eq. 2)}$$

$$\hat{s} = \hat{r} \times \hat{q} \quad \text{(Eq. 3)}$$

Where,

α is the angle between $\hat{m}$ and $\hat{r}$;

β is the angle between $\hat{l}$ and $\hat{r}$; and

γ is the angle between $\hat{j}$ and $\hat{r}$.

At block 1104, a quality of the position estimate for each of the available sensors 104a-104c is determined. The quality of the sensor measurement may be represented by the measurement noise covariance, N, which may be calculated as:

$$N = \sigma_R^2 \hat{r}\hat{r}^T + (R\sigma_\theta)^2 \hat{q}\hat{q}^T + \left(\frac{R\sigma_\theta}{\cos\gamma}\right)^2 \hat{s}\hat{s}^T \qquad (Eq.\ 4)$$

Unit vectors $\hat{r}$, $\hat{q}$, and $\hat{s}$ define the eigenvectors of the measurement noise covariance ellipsoid 202 as shown in FIG. 2. R is a range measurement between a sensor 104a-104c and the target 100, and $\sigma_R$ and $\sigma_\theta$ are the standard deviations of the sensor range and angular measurements, respectively. The measurement variances in the direction of these unit vectors may be determined as follows:

$\sigma_R^2$ is the variance in the direction of $\hat{r}$;

$(R\sigma_\theta)^2$ is the variance in the direction of $\hat{q}$; and $$\left(\frac{R\sigma_\theta}{\cos\gamma}\right)^2$$

is the variance in the direction of $\hat{s}$.

Figure 3:
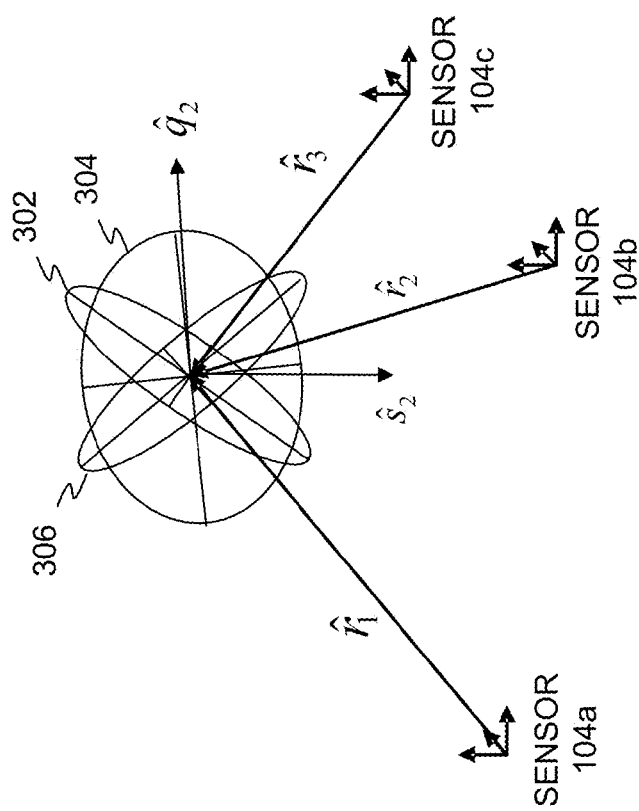
FIG. 3 illustrates the covariance ellipsoids of the sensors illustrated in FIG. 1 due to the sensor-target geometry.

The geometry between a sensor 104a-104c and the target 100, e.g., sensor-target geometry, is determined by decomposing the eigenspace of each tracking radar's time-synchronized measurements and forming a target position error covariance and velocity error covariance. The uncertainty of the position of the target 100 due to the sensor-target geometry for each sensor 104a-104c is shown in FIG. 3. As shown in FIG. 3, the sensor-target geometry error for sensor 104a may be represented by ellipsoid 302, the sensor-target geometry error for sensor 104b may be represented by ellipsoid 304, and the sensor-target geometry error for sensor 104c may be represented by ellipsoid 306.

A set of linear equations identifying the range from each sensor 104a-104c to the target 100 are modeled to characterize the quality of the position estimate of the target. The linear equations may be developed in accordance with the following equation:

$$r^k = \|\vec{x}^k - \vec{x}\| + \tilde{\epsilon}^k \qquad (Eq.\ 5)$$

Where, k is the sensor;

$\vec{x}^k$ is the sensor position;

$\vec{x}$ is the target position; and $\tilde{\epsilon}^k$ is the error associated with the sensor range measurement.

Equation 5 has three unknowns, which include the components of the target position in a Cartesian coordinate frame, e.g., the three components of $\vec{x}$. Accordingly, three range measurements are acquired for a particular solution. In some embodiments, the Cartesian coordinate frame is an ENU coordinate frame or an Earth-Centered-Earth-Fixed (ECEF) coordinate frame. One approach to solving for the position involves taking a set of K measurement equations ($K \geq 3$) and linearizing the equations about an approximate target position. Letting $\vec{x}_o$ be an initial guess at the target position, then an approximate range for a sensor k may be calculated as:

$$r_o^k = \|\vec{x}^k - \vec{x}_o\| + \tilde{\epsilon}^k \qquad (Eq.\ 6)$$

The true position of the target 100 with respect to a sensor 104a-104c is equal to $\vec{x} = \vec{x}_o + \delta\vec{x}$. Accordingly, a linear system of equations may be developed as follows:

$$\delta r^k = r^k - r_o^k$$

$$= \|\vec{x}^k - (\vec{x}_o + \delta\vec{x})\| - \|\vec{x}^k - \vec{x}_o\|$$

Using a first order Taylor series approximation yields:

$$f(x_o + \delta x) = f(x_o) + \frac{\partial f}{\partial x}\bigg|_o \delta x$$

$$\delta r^k \approx -\frac{\vec{x}^k - \vec{x}_0}{\|\vec{x}^k - \vec{x}_0\|} \delta\vec{x} + \tilde{\epsilon}^k$$

$$= -l\hat{o}s^k \delta\vec{x} + \tilde{\epsilon}^k$$

Where, $-l\hat{o}s^k$ is a line-of-sight unit vector pointing from the target 100 to a sensor k.

A matrix representing the linear equations containing each of the line-of-sight (LOS) vectors having K range measurements may be constructed as follows:

$$\delta\vec{r} = \begin{bmatrix} \delta r^1 \\ \delta r^2 \\ \delta r^3 \\ \ldots \\ \delta r^k \end{bmatrix} = \begin{bmatrix} -l\hat{o}s^1 \\ -l\hat{o}s^2 \\ -l\hat{o}s^3 \\ \ldots \\ -l\hat{o}s^k \end{bmatrix} \delta\vec{x} + \tilde{\vec{\epsilon}} \qquad (Eq.\ 7)$$

The above matrix represents a set of linear equations that may be iteratively solved to obtain a position estimate of the target 100 using the measurements from sensors 104a-104c. The above matrix contains one LOS unit vector for each sensor's range measurement. However, three LOS unit vectors are available for each sensor 104a-104c, which are the eigenvectors $\hat{r}$, $\hat{q}$, and $\hat{s}$ obtained from the sensor measurement noise covariance ellipsoids described above. Therefore, the matrix may be augmented with these additional LOS vectors.

At block 1106, an eigenvector matrix, G, describing the sensor-target geometry is created. The eigenvector matrix is created using the eigenvectors used to determine the sensor measurement noise covariance set forth above in Equation 4. The eigenvector matrix characterizes the sensor-target geometry for each of the sensors 104a-104c with respect to the target 100, and may be constructed as follows:

$$G = \begin{bmatrix} -\hat{r}_1^T \\ -\hat{q}_1^T \\ -\hat{s}_1^T \\ -\hat{r}_2^T \\ -\hat{q}_2^T \\ -\hat{s}_2^T \\ \vdots \\ -\hat{r}_k^T \\ -\hat{q}_k^T \\ -\hat{s}_k^T \end{bmatrix} \quad \text{(Eq. 8)}$$

Where,

G is a 3K-by-3 matrix.

Using Equation 8 enables Equation 7 to be rewritten as:

$$\delta \vec{r} = G\delta \vec{x} + \vec{\epsilon} \quad \text{(Eq. 9)}$$

At block 1108, a covariance matrix, H, is generated to evaluate the quality of a position estimate that is based on fused measurements from K sensors. The covariance matrix may be constructed as follows:

$$H = (G^T W^{-1} G)^{-1} \quad \text{(Eq. 10)}$$

Where,

G is the eigenvector matrix in accordance with Equation 8; and

W is a diagonal matrix representing the expected accuracies of each measurement.

The weight matrix W (size 3K by 3K) may be generated as follows:

$$W = diag\left[ \sigma_{R_1}^2 (R_1 \sigma_{\theta_1})^2 \left(\frac{R_1 \sigma_{\theta_1}}{\cos \gamma_1}\right)^2 \ldots \sigma_{R_k}^2 (R_k \sigma_{\theta_k})^2 \left(\frac{R_k \sigma_{\theta_k}}{\cos \gamma_k}\right)^2 \right]. \quad \text{(Eq. 11)}$$

Each element in the diagonal weight matrix W represents the positioning error in the $\hat{r}$, $\hat{q}$, and $\hat{s}$ directions for the K sensors. The diagonal elements of the covariance matrix H represent the variance of the position solution in the directions of the basis vectors of the coordinate frame in which H is expressed.

At block 1110, the quality of the sensor-target geometry combined with the range and angular sensitivity of the K sensors, and thus the accuracy of the positioning estimate, may be calculated using a position dilution of precision (PDOP) estimate. The PDOP value represents the amplification of the standard deviation of the measurement errors of a position estimate onto the position solution. PDOP may be calculated according to:

$$PDOP = \frac{\sqrt{H_{11} + H_{22} + H_{33}}}{\sigma_{Rmin}} \quad \text{(Eq. 12)}$$

Where, $\sigma_{R\ min}$ is the minimum range standard deviation among the sensor measurements.

The circular RMS position error is the standard deviation multiplied by PDOP as follows:

$$RMSerror = PDOP \cdot \sigma_{R\ min} \quad \text{(Eq. 13)}$$

A position estimate having low PDOP and standard deviation values is desirable as they represent a high accuracy and quality of the position estimate for a sensor. The addition of a new sensor will not increase a PDOP value, but it may decrease a PDOP value depending on the sensor-target geometry of the added sensor. Accordingly the fusion of the positioning estimates from certain sensors 104a-104c may be more beneficial than the fusion of positioning estimate for other sensors 104a-104c depending on the geometry and sensitivity of each of the sensors 104a-104c.

The process of fusing positioning estimates from different sensors 104a-104c may increase the errors due to inconsistent covariance matrices, erroneous time stamping, and correlation errors. When multiple sensor measurements are available for data fusion, the PDOP measurement allows the selection of a sub-set of these measurements that will provide the benefits of fusion resulting in a high-quality position estimate while reducing the risks associated with fusion of data from multiple sensors. As set forth above, the PDOP measurement may provide a characterization of the quality of a measurement from a single sensor 104a-104c, or PDOP may provide an estimate of the quality of positioning estimates from combined measurements from multiple sensors 104a-104c.

Figure 4:
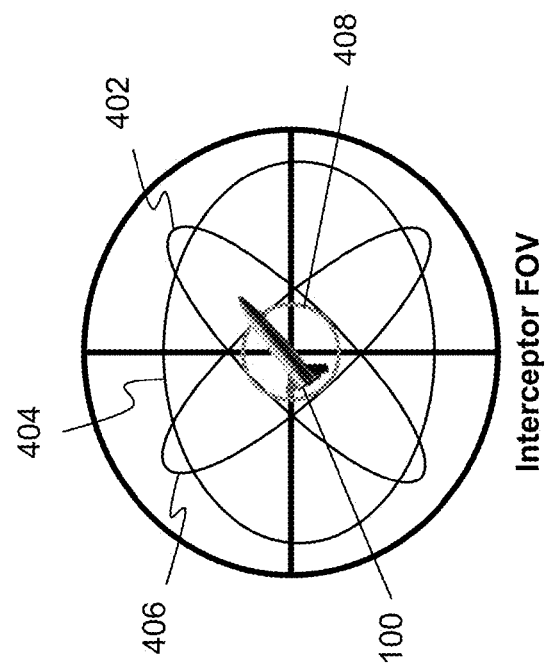
FIG. 4 illustrates the covariance ellipsoids for each of the sensors projected onto the field-of-view (FOV) of the interceptor in accordance with FIG. 1.

The geometry of the interceptor 102 with respect to the target 100, e.g., interceptor geometry, also contributes to uncertainty of a target position. To account for the errors associated with the interceptor geometry, the positioning errors are projected onto the plane of the interceptor's field-of-view (FOV). FIG. 4 illustrates the covariance ellipsoids 402, 404, 406 for each sensor 104a-104c projected onto the plane of the interceptor's FOV. The combined covariance ellipsoid 408 for all of the sensors 104a-104c is also shown in FIG. 4. As described above, the covariance ellipsoid 408 is smaller than the error of the individual sensors 104a-104c. The FOV of the interceptor may have its own reference frame defined by three unit vectors: $\hat{d}$, $\hat{n}$, and $\hat{h}$, where $\hat{n}$ is normal to the plane containing the FOV and $\hat{d}$ and $\hat{h}$ are in-plane vectors normal to each other, as shown in FIG. 1.

At block 1112, a projection matrix, $A_P$, is generated to project the covariance of the sensors 104a-104c onto the FOV of the interceptor 102. The projection matrix may be constructed as follows:

$$A_P = (I_{3\times 3} - \hat{n}\hat{n}^T) \quad \text{(Eq. 14)}$$

Where,

I is a three-by-three identity matrix with ones down the diagonal.

At block 1114, the covariance matrix H may be projected onto the interceptor FOV plane by multiplying it by the projection matrix $A_P$ as follows:

$$H_P = A_P H \quad \text{(Eq. 15)}$$

Where, $H_P$ is the covariance matrix projected onto the FOV plane of the interceptor 102;

$A_P$ is the projection matrix; and

H is the covariance matrix of the combined sensor position estimates.

To quantify the errors with respect to the interceptor, the covariance matrix is transformed to the interceptor's LOS frame as follows:

$$H_P^{LOS} = T_{ECEF}^{LOS} H_P^{NED} T_{ECEF}^{LOS^T} \quad \text{(Eq. 16)}$$

Where, $T_{ECEF}^{LOS} = [\hat{d}\ \hat{n}\ \hat{h}]^T$

At block 1116, the PDOP value is calculated based on the combined measurements of any of the sensors 104a-104c, where the combined covariance matrix is projected onto the interceptor's FOV. Projecting PDOP onto the interceptor's FOV is used to single out errors normal to the LOS of the interceptor 102 in order for the interceptor 102 to maintain the target 100 within the FOV of the interceptor 102 and to guide the interceptor 102 to the target 100. The PDOP value and the associated error, RMS2Derror, may be calculated using Equations 17 and 18 as follows:

$$PDOP = \frac{\sqrt{\text{Trace}(H_P^{LOS})}}{\sigma_{min}} \quad \text{(Eq. 17)}$$

Where, $\sigma_{min}$ is the minimum range error among the sensors.

$$\text{RMS2Derror} = \text{PDOP}\sigma_{min} \quad \text{(Eq. 18)}$$

At decision block 1118, a decision is made to determine if each of the possible sub-sets have been evaluated. If some sub-sets have not been evaluated, then the process moves to block 1106. In this manner the process is iteratively repeated to calculate the PDOP value using all possible combinations of sensors.

Once all of the combinations of sensors have been evaluated, the process moves to block 1120 and a sub-set of available sensors 104a-104c is selected. The sub-set may be selected by minimizing the PDOP with the fewest number of sensors. The following cost function seeks to achieve the lowest PDOP with minimal number of sensors:

$$J = a \cdot \text{PDOP} + b \cdot k \quad \text{(Eq. 19)}$$

Where, a is a weight assigned to PDOP; and b is a weight assigned to the number of sensors.

The sensor combination with the lowest cost function J is selected as the optimal sub-set to be used for data fusion.

At block 1122, the sub-set of sensors may be used to guide an interceptor to a target.

One skilled in the art will understand that the weights a and b may be selected to add more emphasis on accuracy or to minimize the number of sensors that will be used. For example, if having a high degree of accuracy is determined to be more important than using the fewest number of sensors, then the value of a will be more heavily weighted than the value of b. Conversely, if using the fewest number of sensors is determined to be more important than accuracy, then the value of b will be more heavily weighted than the value of a.

At block 1120, the positioning data from the sensors 104a-104c may be used by a guidance system for the interceptor 102 to guide the interceptor 102 to the target 100. Selecting a sub-set of available sensors while minimizing the number of sensors advantageously enables the sensors that are not used to track and guide the interceptor to be used to monitor and track other targets without sacrificing accuracy of the interceptor guidance.

Figure 5:
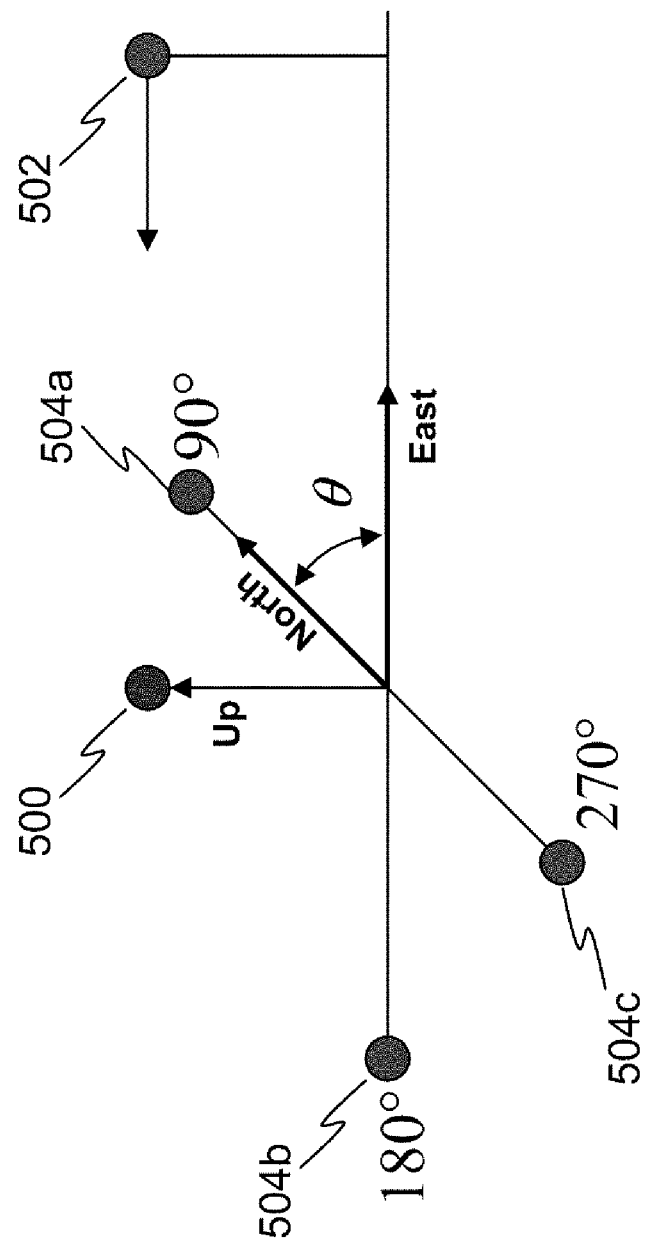
FIG. 5 illustrates another example of multiple sensors configured to track a target and guide an interceptor.

FIG. 5 illustrates one example of an interceptor 502 targeting a target 500. As shown in FIG. 5, sensors 504a, 504b, and 504c are positioned at 90 degrees, 180 degrees, and 270 degrees from target 500, respectively, in an ENU coordinate system. For the purposes of this example, the variances of the position estimates for each of the sensors 504a-504c illustrated in FIG. 5 are set as follows:

$$\sigma_R^2 = 1$$

$$(R\sigma_\theta)^2 = 50$$

$$\left(\frac{R\sigma_\theta}{\cos\gamma}\right)^2 = 50$$

Figure 6:
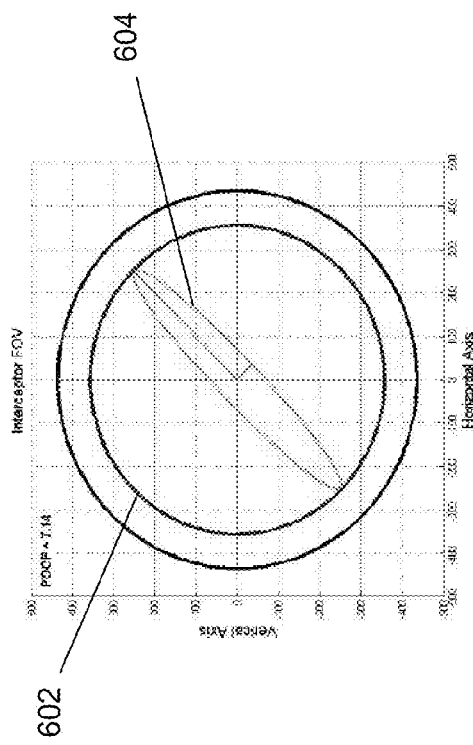
FIG. 6 illustrates the covariance ellipsoid and the RMS2Derror of a sensor projected onto the FOV of the interceptor as shown in FIG. 5.

FIG. 6 illustrates the covariance ellipsoid 604 and the RMS2Derror 602 of sensor 504a illustrated in FIG. 5 projected onto the FOV of the interceptor 502. As shown in FIG. 6, a large angular error results in a large value for the circular RMS2Derror value. The calculated value of PDOP for this example is 7.14, which is calculated in accordance with Equation 14 above.

Figure 7:
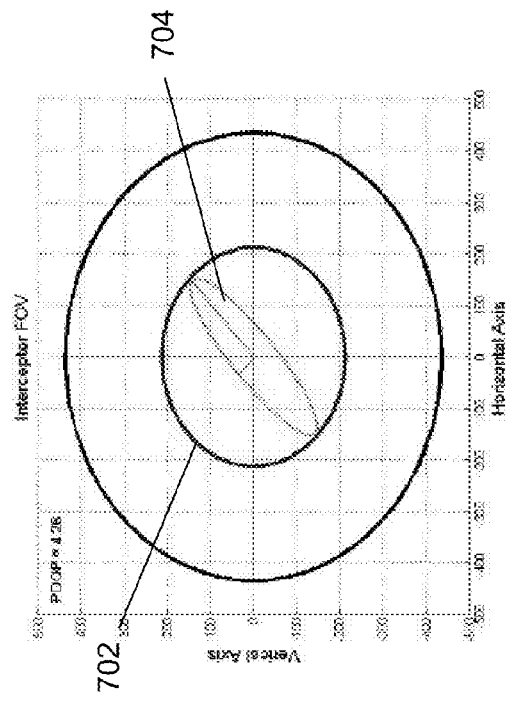
FIG. 7 illustrates the combined covariance ellipsoid and the RMS2Derror of a combination of two sensors projected onto the FOV of the interceptor in accordance with FIG. 5.

FIG. 7 illustrates the covariance ellipsoid 704 and the RMS2Derror 702 for the combination of sensors 504a and 504b illustrated in FIG. 5 projected onto the FOV of the interceptor 502. As shown in FIG. 7, the RMS2Derror is reduced compared to using a single sensor 504a as illustrated in FIG. 6. The calculated value of PDOP for the combination of sensors 504a and 504b is 4.26.

Figure 8:
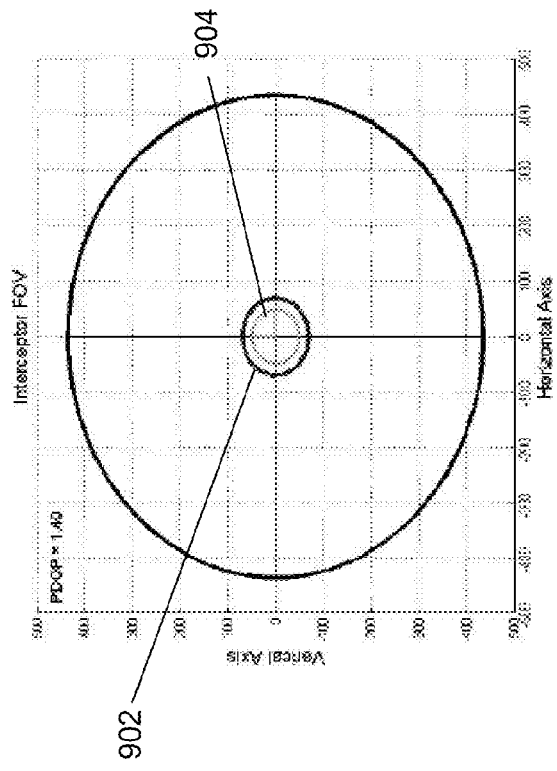
FIG. 8 illustrates the combined covariance ellipsoid and the RMS2Derror of each of the sensors projected onto the FOV of the interceptor in accordance with FIG. 5.

FIG. 8 illustrates the covariance ellipsoid 804 and the RMS2Derror 802 for the combination of sensors 504a, 504b, and 504c shown in FIG. 5 projected onto the FOV of the interceptor 502. As shown in FIG. 8, the RMS2Derror is significantly reduced compared to using a single sensor 104a as illustrated in FIG. 6, or the combination of sensors 504a and 504b as illustrated in FIG. 7. The calculated value of PDOP is 1.37 for the three sensors 504a-504c.

Figure 9:
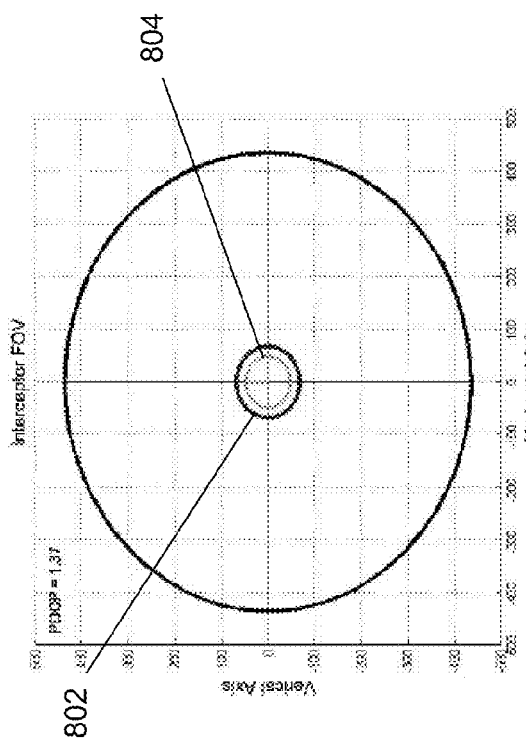
FIG. 9 illustrates the combined covariance ellipsoid and the RMS2Derror of another combination of two sensors projected onto the FOV of the interceptor in accordance with FIG. 5.

FIG. 9 illustrates the covariance ellipsoid 904 and the RMS2Derror 902 and for the combination of sensors 504a and 504c shown in FIG. 5 projected onto the FOV of the interceptor 502. As shown in FIG. 9, the RMS2Derror is reduced compared to using a single sensor 504a as illustrated in FIG. 6 and a combination of sensors 504a and 504b as illustrated in FIG. 7. As seen by comparing FIGS. 8 and 9, the addition of sensor 504b to the combination of sensors 504a and 504c does not provide a significant increase in the positioning accuracy. Accordingly, sensors 504a and 504c may be selected and used to guide interceptor 502 to target 500 without sacrificing a significant amount of accuracy and enables sensor 504b to be used to track other targets.

Figure 10:
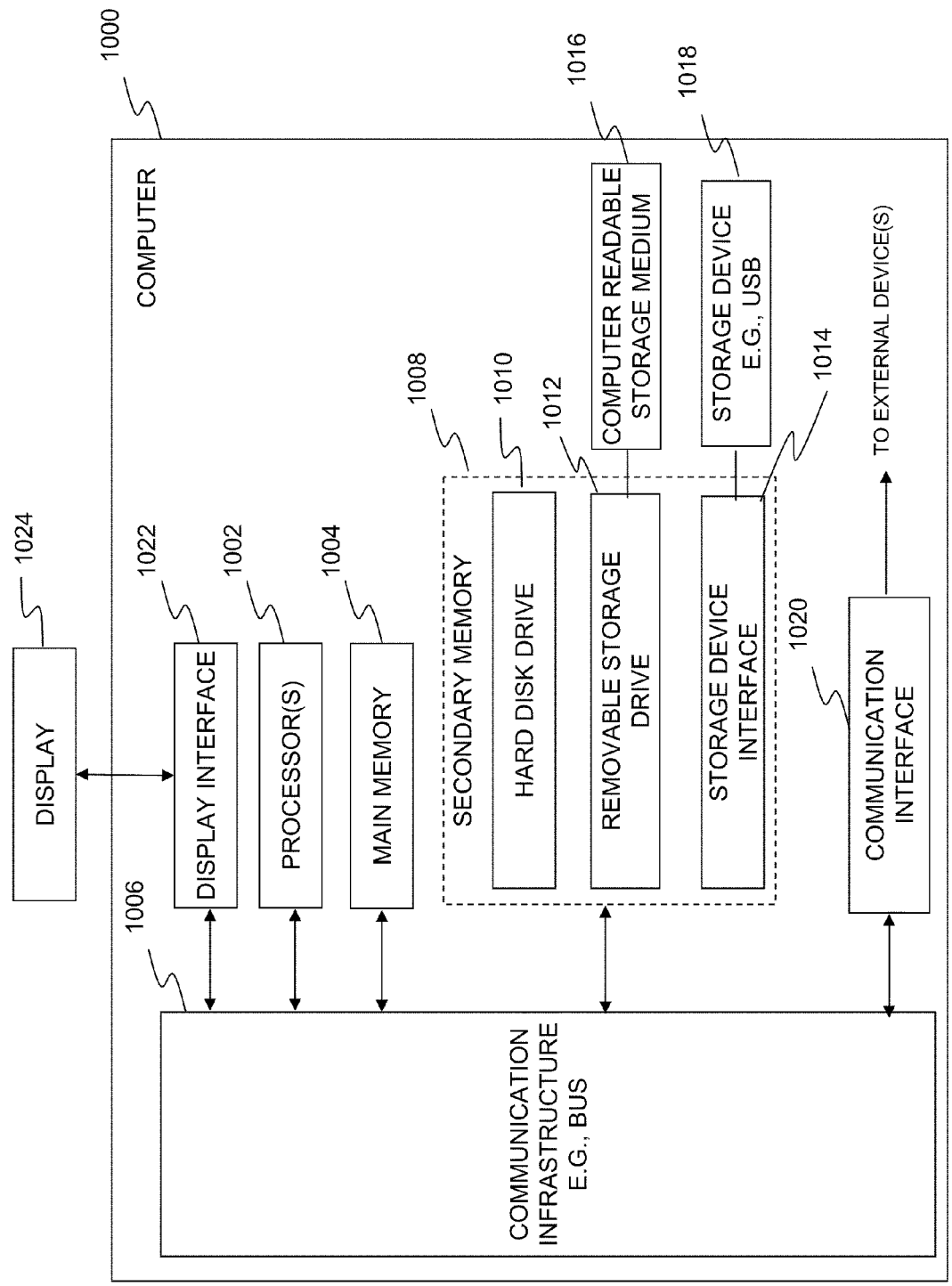
FIG. 10 illustrates one example of a system configured to select a sub-set of available sensors and guide an interceptor to a target.

The method of selecting a sub-set of sensors may be implemented using hardware, software, or a combination thereof and may be implemented in one or more computer systems or other processing systems. In one embodiment, the method is carried out in a computer system. FIG. 10 illustrates one example of an architecture of a computer system 1000 that may be configured to perform the method described herein. As shown in FIG. 10, computer system 1000 may include one or more processors, such as processor(s) 1002, which may be configured to run a multitasking operating system. The processor(s) 1002 are connected to a communication infrastructure 1006 (e.g., a communications bus, cross-over bar, or network). Various software embodiments are described in terms of this exemplary computer system. After reading this description, it will be apparent to one skilled in the art how to implement the method using other computer systems or architectures.

Computer system 1000 can include a display interface 1022 that forwards graphics, text, and other data from the communication infrastructure 1006 (or from a frame buffer not shown) for display on a display unit 1026.

Computer 1000 may include a main memory 1004, such as a random access (RAM) memory. Computer 1000 may also include a secondary memory 1008, which may be a more persistent memory than main memory 1004. The secondary memory 1008 may include, for example, a hard disk drive 1010 and/or removable storage drive 1012, representing a floppy disk drive, a magnetic tape drive, an optical disk drive, DVD, blu-ray drive, ZIP™ drive, or the like. The removable storage drive 1012 reads from and/or writes to a removable computer readable storage unit 1016 in a known manner. Removable computer readable storage unit 1016 represents a floppy disk, magnetic tape, optical disk, DVD, blu-ray disk, ZIP™ disk, or the like, which is read by and written to by removable storage drive 1012. As will be appreciated, the removable computer readable storage unit 1016 may have computer software and/or data stored therein.

In some embodiments, secondary memory 1008 may include other similar devices for allowing computer programs or other instructions to be loaded into computer system 1000. Such device may include, for example a removable storage unit 1018 and an interface 1014. Examples of such a removable storage unit and interface may include a universal serial bus (USB) memory device and interface.

Computer system 1000 may also include a communications interface 1020, which allows software and data to be transferred between computer system 1000 and external devices, such as sensors 104a-104c, interceptor 102, or the like. Examples of communications interface 1020 may include a modem, a network interface (such as an Ethernet card), a communications port, a Personal Computer Memory Card International Association (PCMCIA) slot and card, etc. Software and data transferred via communications interface 1020 are in the form of signals which may be electronic, electromagnetic, optical, or other signals capable of being received by communications interface 1020. These signals are provided to communications interface 1020 via a communications path (e.g., channel), which may be implemented using wire or cable, fiber optics, a telephone line, a cellular link, a radio frequency (RF) link and other communication channels.

In this document, the terms "computer program medium" and "computer readable storage medium" refer to media such as removable storage drive 1012, a hard disk installed in hard disk drive 1010, and signals. These computer program products provide software to computer system 1000. Computer programs (also referred to as computer control logic) are stored in main memory 1004 and/or secondary memory 1008. Computer programs may also be received via communications interface 1020. Such computer programs, when executed by a processor, enable the computer system 1000 to perform the features of the method discussed herein.

In an embodiment where the invention is implemented using software, the software may be stored in a computer readable storage medium and loaded into computer system 1000 using removable storage drive 1012, hard drive 1010, or communications interface 1020. The software, when executed by a processor(s) 1002, causes the processor(s) 1002 to perform the functions of the method described herein.

In another embodiment, the method is implemented primarily in hardware using, for example, hardware components such as application specific integrated circuits (ASICs). Implementation of the hardware state machine so as to perform the functions described herein will be apparent to persons skilled in the art.

In yet another embodiment, the method is implemented using a combination of both hardware and software.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method of selecting a sub-set of a plurality of available sensors to guide an interceptor to a target, comprising:

characterizing a quality of position estimate received from each of the plurality of available sensors;

projecting the positioning errors of the sensors onto a plane normal to a line-of-sight of the interceptor; and selecting the sub-set of the plurality of available sensors based on the projection of positioning errors.

2. The method of claim 1, wherein characterizing the quality of position estimates for each of the plurality of available sensors includes:

calculating a noise covariance for the position estimate;

generating an eigenvector matrix based on the noise covariance;

generating a covariance matrix based on the eigenvector matrix and an error matrix; and calculating a position dilution of precision (PDOP) based on the covariance matrix.

3. The method of claim 2, wherein the noise covariance for each position estimate is calculated according to:

$$N = \sigma_R^2 \hat{r}\hat{r}^T + (R\sigma_\theta)^2 \hat{q}\hat{q}^T + \left(\frac{R\sigma_\theta}{\cos\gamma}\right)^2 \hat{s}\hat{s}^T$$

where, $\hat{r}$ is a unit vector along a line-of-sight of a sensor, $\hat{q}$ is a unit vector normal to the line-of-sight of the sensor, $\hat{s}$ is a unit vector normal to the line-of-sight of the sensor, $\gamma$ is an angle of $\hat{r}$ with respect to the line-of-sight of the sensor, $\sigma_R^2$ is a variance in the direction of $\hat{r}$, $(R\sigma_\theta)^2$ is a variance in the direction of $\hat{q}$, and $$\left(\frac{R\sigma_\theta}{\cos\gamma}\right)^2$$

is a variance in the direction of $\hat{s}$.

4. The method of claim 2, wherein the covariance matrix is generated according to:

$$H = (G^T W^{-1} G)^{-1}$$

where,

G is the eigenvector matrix, and $$W = diag\left[\sigma_{R_1}^2 (R_1\sigma_{\theta_1})^2 \left(\frac{R_1\sigma_{\theta_1}}{\cos\gamma_1}\right)^2 \ldots \sigma_{R_k}^2 (R_k\sigma_{\theta_k})^2 \left(\frac{R_k\sigma_{\theta_k}}{\cos\gamma_k}\right)^2\right].$$

5. The method of claim 4, wherein G is calculated according to $$G = \begin{bmatrix} -\hat{r}_1^T \\ -\hat{q}_1^T \\ -\hat{s}_1^T \\ -\hat{r}_2^T \\ -\hat{q}_2^T \\ -\hat{s}_2^T \\ \ldots \\ -\hat{r}_k^T \\ -\hat{q}_k^T \\ -\hat{s}_k^T \end{bmatrix}$$

where, $\hat{r}$ is a unit vector along a line-of-sight of a sensor, $\hat{q}$ is a unit vector normal to the line-of-sight of the sensor, $\hat{s}$ is a unit vector normal to the line-of-sight of the sensor.

6. The method of claim 2, wherein PDOP is calculated according to:

$$PDOP = \frac{\sqrt{H_{11} + H_{22} + H_{33}}}{\sigma_{min}}$$

where,
$\sigma_{min}$ is the minimum range error of the sensors.

7. The method of claim 1, wherein projecting the sensor positioning errors onto the plane normal to the line-of-sight of the interceptor includes:
generating a projection matrix, the projection matrix is based on a field-of-view (FOV) of the interceptor;
combining the projection matrix and a covariance matrix, the covariance matrix based on an eigenvector matrix and an error matrix; and
calculating a position dilution of precision (PDOP) based on the combination of the projection matrix and the covariance matrix.

8. The method of claim 7, wherein the projection matrix is generated according to:

$$A_P = (I_{3\times3} - \hat{n}\hat{n}^T)$$

where,
$\hat{n}$ is a unit vector normal to a plane containing the FOV of the interceptor, and
I is a three-by-three identity matrix with ones down the diagonal.

9. The method of claim 7, wherein the projection matrix and covariance matrix are combined according to:

$$H_P = A_P H$$

where,
$A_P$ is a projection matrix, and
H is the covariance matrix.

10. The method of claim 7, wherein the PDOP is calculated according to:

$$PDOP = \frac{\sqrt{\text{Trace}(H_P^{LOS})}}{\sigma_{min}}$$

where,
$H_P^{LOS}$ is a covariance matrix projected onto the FOV of the interceptor, and
$\sigma_{min}$ is a minimum range error among the sensors.

11. The method of claim 7, further comprising:
guiding the interceptor to the target using positioning data received from the sub-set of available sensors.

12. A system for selecting a sub-set of a plurality of available sensors to guide an interceptor to a target, comprising:
a computer readable storage medium; and
a processor in communication with the computer readable storage medium, the processor configured to:
characterize a quality of position estimate received from each of the plurality of available sensors;
project the positioning errors of the sensors onto a plane normal to a line-of-sight of the interceptor; and
select the sub-set of the plurality of available sensors based on the projection of positioning errors.

13. The system of claim 12, wherein the processor is further configured to:
calculate a noise covariance for the position estimate;
generate an eigenvector matrix based on the noise covariance;
generate a covariance matrix based on the eigenvector matrix and an error matrix; and
calculate a position dilution of precision (PDOP) based on the covariance matrix.

14. The system of claim 13, wherein the noise covariance for each position estimate is calculated according to:

$$N = \sigma_R^2 \hat{r}\hat{r}^T + (R\sigma_\theta)^2 \hat{q}\hat{q}^T + \left(\frac{R\sigma_\theta}{\cos\gamma}\right)^2 \hat{s}\hat{s}^T$$

where,
$\hat{r}$ is a unit vector along a line-of-sight of a sensor,
$\hat{q}$ is a unit vector normal to the line-of-sight of the sensor,
$\hat{s}$ is a unit vector normal to the line-of-sight of the sensor,
$\gamma$ is an angle of $\hat{r}$ with respect to the line-of-sight of the sensor,
$\sigma_R^2$ is a variance in the direction of $\hat{r}$,
$(R\sigma_\theta)^2$ is a variance in the direction of $\hat{q}$, and $$\left(\frac{R\sigma_\theta}{\cos\gamma}\right)^2$$

is a variance in the direction of $\hat{s}$.

15. The system of claim 13, wherein the covariance matrix is generated according to:

$$H = (G^T W^{-1} G)^{-1}$$

where,
G is the eigenvector matrix, and $$W = diag\left[\sigma_{R_1}^2 (R_1\sigma_{\theta_1})^2 \left(\frac{R_1\sigma_{\theta_1}}{\cos\gamma_1}\right)^2 \ldots \sigma_{R_k}^2 (R_k\sigma_{\theta_k})^2 \left(\frac{R_k\sigma_{\theta_k}}{\cos\gamma_k}\right)^2\right].$$

16. The system of claim 15, wherein G is calculated according to $$G = \begin{bmatrix} -\hat{r}_1^T \\ -\hat{q}_1^T \\ -\hat{s}_1^T \\ -\hat{r}_2^T \\ -\hat{q}_2^T \\ -\hat{s}_2^T \\ \ldots \\ -\hat{r}_k^T \\ -\hat{q}_k^T \\ -\hat{s}_k^T \end{bmatrix}$$

where,
$\hat{r}$ is a unit vector along a line-of-sight of a sensor,
$\hat{q}$ is a unit vector normal to the line-of-sight of the sensor,
$\hat{s}$ is a unit vector normal to the line-of-sight of the sensor.

17. The system of claim 13, wherein PDOP is calculated according to:

$$PDOP = \frac{\sqrt{H_{11} + H_{22} + H_{33}}}{\sigma_{min}}$$

where,
$\sigma_{min}$ is a minimum range error among the sensors.

18. The system of claim 12, wherein the processor is further configured to:
  generate a projection matrix, the projection matrix is based on the field-of-view (FOV) of the interceptor;
  combine the projection matrix and a covariance matrix, the covariance matrix based on an eigenvector matrix and an error matrix; and
  calculate a position dilution of precision (PDOP) based on the combination of the projection matrix and the covariance matrix.

19. The system of claim 18, wherein the projection matrix is generated according to:

$$A_P = (I_{3\times3} - \hat{n}\hat{n}^T)$$

where,
  $\hat{n}$ is a unit vector normal to a plane containing the FOV of the interceptor, and
  I is a three-by-three identity matrix with ones down the diagonal.

20. The system of claim 18, wherein the projection matrix and covariance matrix are combined according to:

$$H_P = A_P H$$

where,
  $A_P$ is a projection matrix, and
  H is the covariance matrix.

21. The system of claim 18, wherein the PDOP is calculated according to:

$$PDOP = \frac{\sqrt{\text{Trace}(H_P^{LOS})}}{\sigma_{min}}$$

where,
  $H_P^{LOS}$ is a covariance matrix projected onto the FOV of the interceptor, and
  $\sigma_{min}$ is the minimum range error among the sensors.

22. The system of claim 18, wherein the processor is further configured to:
  guide the interceptor to the target using positioning data received from the sub-set of available sensors.

23. A machine readable storage medium encoded with program code, wherein when the program code is executed by a processor, the processor performs a method, the method comprising:
  characterizing a quality of position estimate received from each of the plurality of available sensors;
  projecting the positioning errors of the sensors onto a plane, the plane being normal to a line-of-sight of the interceptor; and
  selecting the sub-set of the plurality of available sensors based on the projection of positioning errors.

24. The machine readable storage medium of claim 23, wherein characterizing the quality of position estimates for each of the plurality of available sensors includes:
  calculating a noise covariance for the position estimate;
  generating an eigenvector matrix based on the noise covariance;
  generating a covariance matrix based on the eigenvector matrix and an error matrix; and
  calculating a position dilution of precision (PDOP) based on the covariance matrix.

25. The machine readable storage medium of claim 24, wherein the noise covariance for each position estimate is calculated according to:

$$N = \sigma_R^2 \hat{r}\hat{r}^T + (R\sigma_\theta)^2 \hat{q}\hat{q}^T + \left(\frac{R\sigma_\theta}{\cos\gamma}\right)^2 \hat{s}\hat{s}^T$$

where,
  $\hat{r}$ is a unit vector along a line-of-sight of a sensor,
  $\hat{q}$ is a unit vector normal to the line-of-sight of the sensor,
  $\hat{s}$ is a unit vector normal to the line-of-sight of the sensor,
  $\gamma$ is an angle of $\hat{r}$ with respect to the line-of-sight of the sensor,
  $\sigma_R^2$ is a variance in the direction of $\hat{r}$,
  $(R\sigma_\theta)^2$ is a variance in the direction of $\hat{q}$, and $$\left(\frac{R\sigma_\theta}{\cos\gamma}\right)^2$$

is a variance in the direction of $\hat{s}$.

26. The machine readable storage medium of claim 24, wherein the covariance matrix is generated according to:

$$H = (G^T W^{-1} G)^{-1}$$

where,
  G is the eigenvector matrix, and $$W = diag\left[\sigma_{R_1}^2 (R_1\sigma_{\theta_1})^2 \left(\frac{R_1\sigma_{\theta_1}}{\cos\gamma_1}\right)^2 \ldots \sigma_{R_k}^2 (R_k\sigma_{\theta_k})^2 \left(\frac{R_k\sigma_{\theta_k}}{\cos\gamma_k}\right)^2\right].$$

27. The machine readable storage medium of claim 26, wherein G is calculated according to $$G = \begin{bmatrix} -\hat{r}_1^T \\ -\hat{q}_1^T \\ -\hat{s}_1^T \\ -\hat{r}_2^T \\ -\hat{q}_2^T \\ -\hat{s}_2^T \\ \ldots \\ -\hat{r}_k^T \\ -\hat{q}_k^T \\ -\hat{s}_k^T \end{bmatrix}$$

where,
  $\hat{r}$ is a unit vector along a line-of-sight of a sensor,
  $\hat{q}$ is a unit vector normal to the line-of-sight of the sensor,
  $\hat{s}$ is a unit vector normal to the line-of-sight of the sensor.

28. The machine readable storage medium of claim 24, wherein PDOP is calculated according to:

$$PDOP = \frac{\sqrt{H_{11} + H_{22} + H_{33}}}{\sigma_{min}}$$

where, $\sigma_{min}$ is a minimum range error among the sensors.

29. The machine readable storage medium of claim 23, wherein projecting the sensor positioning errors onto the plane normal to a line-of-sight of the interceptor includes:

generating a projection matrix, the projection matrix is based on the field-of-view (FOV) of the interceptor;

combining the projection matrix and a covariance matrix, the covariance matrix based on an eigenvector matrix and an error matrix; and calculating a position dilution of precision (PDOP) based on the combination of the projection matrix and the covariance matrix.

30. The machine readable storage medium of claim 29, wherein the projection matrix is generated according to:

$$A_P = (I_{3\times 3} - \hat{n}\hat{n}^T)$$

where, $\hat{n}$ is a unit vector normal to a plane containing the FOV of the interceptor, and I is a three-by-three identity matrix with ones down the diagonal.

31. The machine readable storage medium of claim 29, wherein the projection matrix and covariance matrix are combined according to:

$$H_P = A_P H$$

where, $A_p$ is a projection matrix, and

H is the covariance matrix.

32. The machine readable storage medium of claim 29, wherein the PDOP is calculated according to:

$$PDOP = \frac{\sqrt{\mathrm{Trace}(H_P^{LOS})}}{\sigma_{min}}$$

where, $H_P^{LOS}$ is a covariance matrix projected onto the FOV of the interceptor, and $\sigma_{min}$ is a minimum range error among the sensors.

33. The machine readable storage medium of claim 29, further comprising:

guiding the interceptor to the target using positioning data received from the sub-set of available sensors.

* * * * *